Patented Apr. 27, 1943

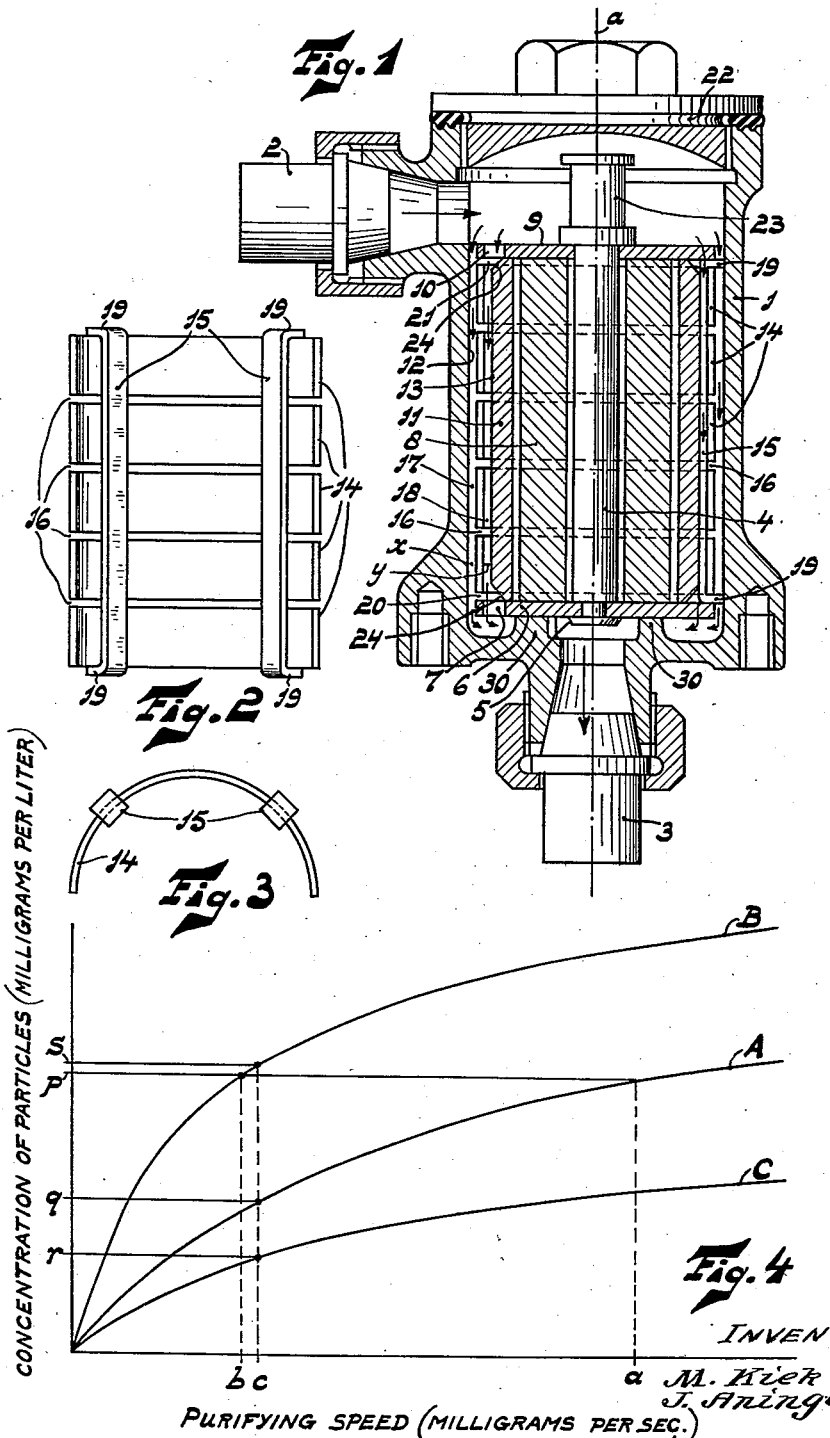

2,317,774

UNITED STATES PATENT OFFICE 2,317,774

MAGNETIC FILTER

Maurits Kiek and Johan Aninga, Eindhoven, Netherlands, assignors, by mesne assignments, to Hartford National Bank and Trust Company, Hartford, Conn., as trustee Application March 14, 1939, Serial No. 261,824
In Germany April 1, 1938

6 Claims. (Cl. 209—215)

Our invention relates to a magnetic filter for removing particles of magnetizable materials from a flowing fluid, particularly a liquid, and for retaining these particles.

Although various types of magnetic filters or separators have been proposed for removing magnetic and non-magnetic particles from a mixture, such filters are generally unsuited for removing contaminating particles from a flowing fluid. For this latter purpose, and especially for purifying lubricating oil, it has been proposed to use filters in which the flowing fluid is subjected to a magnetic field in such a manner that the contaminating particles are removed from the fluid and are collected and retained in the filter.

Such filters have the characteristic feature that at a given moment the quantity of particles being removed from the fluid per unit of time, i. e. the "purification speed," depends upon the quantity of particles contained within a unit volume of the fluid, i. e. the concentration of the particles, and this dependency is such that the quantity of particles being removed increases with the concentration. This is due to the fact that the capacity of the filter for intercepting more particles per unit of time increases as the concentration becomes stronger. When starting with a definite concentration, and assuming no new particles are added to the fluid, theoretically all particles could be removed from the fluid in a period of time determined by the concentration-dependent decrease in purification speed.

Present-day filters of this type have several disadvantages. For example, the magnetic particles separated from the fluid are retained at a point in the path of the flowing fluid with the result that after a certain period of operation the filter becomes inoperative due to the fact that the flowing fluid dislodges and carries away a quantity of collected particles substantially equal to the quantity being removed from the fluid. Furthermore, complete purification of the fluid is hardly possible in practice by means of the known filters.

The main object of the present invention is to overcome the above difficulties and to provide a filter with which the desired purification is effected in a materially shorter working time than with known filters of this type of about the same size.

A further object is to provide a filter in which the collected particles do not obstruct the flow of the fluid through the filter.

A still further object is to provide a filter which is capable of retaining a large quantity of collected particles while still remaining operative, and from which the collected particles can be readily removed.

Further objects and advantages will appear as the description progresses.

In accordance with the invention we so construct the filter that a magnetic field is set up in one or more air-gaps which lie substantially outside the path of the flowing fluid, whereby the particles are magnetically withdrawn from the fluid and retained in these air-gaps. In the air-gaps the particles are substantially out of contact with the flowing fluid, and thus can be retained there until the filter has to be cleaned, i. e., when the air-gaps are completely filled.

The magnetic field may be produced in various ways, but we prefer for simplicity to use a permanent magnet. Furthermore, in order that the magnetic field produced by the permanent magnet will be as strong as possible, we prefer, in a manner already known per se for magnetic filters, to produce the magnetic field between pole pieces of magnetically-soft magnetizable material. When a plurality of air-gaps are used we prefer to magnetize the same in series by one or more magnets, because if one of the air-gaps becomes short-circuited, for instance becomes completely filled with collected metal particles, the magnetomotive force of the magnet is distributed over the remaining air-gaps and consequently produces higher magnetic field intensity therein.

In one embodiment of the invention we combine the pole-pieces into one or more mechanical units to provide a smooth surface interrupted by the air-gaps at certain points. We so arrange this unit or units that the fluid flows through the filter, for instance parallel to the longitudinal direction of the air-gaps, with the result that the air-gaps are substantially beyond the path of flow of the fluid, and the metal particles accumulated in the air-gaps will not be dislodged by the flowing fluid.

In a particularly advantageous construction the pole-pieces form parts of a composite cylindrical member, which parts are spaced apart in an axial direction to form air-gaps. The inlet and outlet for the fluid, as well as the housing surrounding the pole-pieces, are arranged in such a manner that the fluid is compelled to flow past each air-gap in an axial or substantially axial direction. It is preferable that the fluid also flow through the interior of the cylindrical member past the air-gaps, and for this purpose a cylindrically-shaped member may be provided to form with the inner surface of the pole-piece member a guide channel extending in an axial direction.

In the last-mentioned form of construction it is advantageous that the cylindrical member formed by the pole pieces be divided axially or substantially axially in order that it can be readily removed and the air-gaps will be accessible on both sides for cleaning purposes.

In order that the invention may be clearly understood and readily carried into effect, we shall describe the same in more detail with reference to the accompanying drawing, in which, Figure 1 is a sectionized side view of a filter according to the invention, Fig. 2 is a side view of one-half of the pole-piece unit of Figure 1, Fig. 3 is a plan view of the pole-piece unit of Figure 2, and Fig. 4 is a graph containing characteristic curves of the filters.

The filter illustrated in Figure 1 comprises a cup-shaped housing 1 of non-magnetic material, for instance brass or aluminum, provided with an inlet connection 2 and an outlet connection 3 for the fluid to be filtered, for instance lubricating oil contaminated by iron particles. The upper end of the housing is provided with a removable cover 22, and the lower end is tapped to receive holding bolts (not shown).

Centrally arranged within the cavity of housing 1 is a rod-shaped supporting member 4 of non-magnetic material, such as brass, to the lower end of which is riveted by means of the flanged edge 5 a circular pole plate 6. Plate 6, which may be of soft iron, is provided near its periphery with a plurality of apertures 7, and bears at various points on several projecting portions 30 of housing 1. Surrounding rod 4 is a tubular permanent magnet 8 whose lower surface is in good magnetic contact with pole plate 6. Magnet 8 is preferably made of a type of steel having (BHmax.) value of from 1.5x10$^6$ to 2x10$^6$ and more, for instance a NiAlCoTi alloy.

Bearing on the upper surface of magnet 8 is a second pole plate 9 which is similar to plate 6 and is provided with a plurality of apertures 10. The magnet is fixed laterally by the rod 4 and is held clamped between the pole plates 6 and 9 by a nut 23 screwed on the upper end of rod 4. Nut 23 also serves as a knob for removing the filtering unit from the housing.

Clamped between plates 6 and 9 and surrounding magnet 8 with an angular space, is an annular guide member 11 of non-magnetic material, such as aluminum, whose ends are tapered at 24 for a purpose later to be described. In the space between the inner surface 12 of housing 1 and the outer surface 13 of guide member 11 are two pole-piece units (only one being shown) each comprising a plurality of pole-pieces 14 of magnetizable material, for instance cold-rolled steel.

As shown more clearly in Figs. 2 and 3, the pole-pieces 14 are of semicircular shape, and are united in groups to form a mechanical unit by means of two strips 15 of non-magnetic material, for instance brass, which may, for instance, be welded to the pole-pieces in such a manner that the resulting composite body has a cylindrical surface which is interrupted at certain points by several semicircular air-gaps 16. The strips 15 have their ends bent outwardly to form projecting portions 19.

In Fig. 1 two of the units shown in Figures 2 and 3 surround the guide member 11 to thereby form with the surfaces 12 and 13 two annular passages 17 and 18 having widths $x$ and $y$ respectively, which in the present instance are equal. The two units are arranged with the ends of pole-pieces 14 of each unit in contact to thereby form the passageway 18, and the ends of portions 19 engage the surface 12 to form the passageway 17. Furthermore, portions 19 bear upon the inner surfaces of plates 6 and 9 to form annular air-gaps 20 and 21, which are connected in series with the air-gaps 16.

The magnetic flux produced by magnet 8 passes through pole plate 9, air-gap 21, pole-pieces 14 and air-gaps 16, and pole plate 6.

The provision of air-gaps 20 and 21 is advantageous from both a magnetic and a mechanical viewpoint. More particularly, in comparison with the case in which the upper and bottom pole-pieces 14 are secured to the pole plates 9 and 6 respectively, the magnetic leakage is decreased and the pole-pieces and pole plates need not be machined to close tolerances, because any position deviations of the pole-pieces with respect to the pole plates occurring in the course of construction are compensated by the air-gaps 20 and 21. If the two pole-piece units were to be mechanically secured, for instance welded, to the pole plates, the pole plates would have to be divided in two parts in order that, after the filter unit had been removed from the housing, the two pole-piece units could be removed in a lateral direction to allow complete removal of the collected particles from the air-gaps. In the construction illustrated the pole plates are made in a single piece and it is only necessary to remove laterally the pole-piece units.

The fluid being filtered enters the filter through connection 2, and passes through guide passages 17 and 18 in the direction of the arrows, i. e. flows past the air-gaps 16, 20 and 21 from top to bottom, i. e. in the direction of the cylinder axis $a$—$a$. In the form of construction illustrated the fluid flows on both sides of the air-gaps so that they are bilaterally utilized.

The flow through the inner guide passage 18 takes place by supplying the fluid through the holes 10 of the pole plate 9 and by carrying it off through the holes 7 of the pole plate 6. This is facilitated by the tapered edges 24 of the guide member 11.

As appears from the drawing, the air-gaps are located substantially outside the path of the fluid so that the metal particles attracted from both sides into these air-gaps can not only be accumulated in the air-gaps, but will not be dislodged by the flowing fluid, and thus will be retained until the filter is cleaned.

The cross-section area of the two guide passages 17 and 18 is preferably chosen in accordance with the desired speed of flow of the fluid. If this area is too large, the contaminating particles will not be attracted by the air-gaps in view of the available field intensity, kind and size of the particles and viscosity of the medium. It can be determined for each case to what extent the speed can be increased in order that the magnetic field beyond the air-gaps may still deflect the stream of metal particles and the field set up in the air-gaps suffices to retain them.

While we have described a cylindrical construction, the invention is not limited thereto, but can be used with other shapes. The individual pole-pieces may, for instance, be straight so as to obtain a flat or prismatic filter construction.

The characteristic properties of the type of filter with which the invention is concerned are shown in Fig. 4, in which the abscissae represent the purifying speed (mg./sec.) and the ordinates represent the concentration of the particles (mg./l). From curve A it appears that during the purification operation, i. e. with a decrease in concentration, the purifying speed also decreases until it becomes zero after a certain time when all particles have been removed from the fluid. It will be appreciated that the time in which this is effected depends upon the shape of the curve. Assumed, for instance, that when using a filter having a curve A, with a concentration $p$ the purification begins at a speed $a$, then the speed will, at every moment, be materially higher than if the purification were effected with a filter having a curve B and an initial speed $b$. Due to this the entire purifying operation in the first-mentioned case proceeds much more rapidly than in the last-mentioned case. The advantages gained by such filters is shown by the difference between the curves A and B.

It should be remarked that with well-known filters it has been impracticable, even without intermediate cleaning of the filter, to attain the zero-point of the curve, because complete removal of the particles from the fluid would take too long a time in practice. As has been stated above, this is due to the fact that in these filters the collected particles are for the greater part retained in the path of flow of the fluid and are consequently partly carried away again by the fluid. Although by repeatedly cleaning the filter the remainder left in the fluid can be reduced, in practice always a small amount remains.

In the above only the case was considered in which no new metal particles were supplied to the fluid during the purifying operation. However, in practice metal particles are usually being continually introduced into the fluid from the members, for instance gears, subject to continuous wear and tear, and these particles must be eliminated to the highest possible degree from the circulating lubricating oil. The function of the filter according to the invention will be explained hereinafter also for this case. To this end reference is made to the curves shown in Fig. 4, it being assumed again that the curve A exhibits the characteristic properties of a good filter, whereas the curve B exhibits the same properties of a filter of inferior quality.

The capacity of the filter for both case A and for case B is preferably so chosen that initially the purifying speed is higher than the speed at which new particles are introduced into the fluid. Under these conditions the concentration first decreases until finally there exists an equilibrium condition in which the particles intercepted equal the particles introduced. It is assumed that for filter A this state is attained at a concentration $q$ corresponding to a purifying speed $c$. This means that for the filter A a quantity of $q$ mg./l is always present in the fluid, because during each second $c$ mg. particles are removed from the oil, whereas an equal quantity of particles are being added due to wear and tear. If the concentration $q$ has an extremely high value, a filter having a curve C may be used, in which case for the same quantity $c$ continuously detached per second from the members to be lubricated, the equilibrium with the filter C is reached at a smaller concentration $r$. Consequently, the filter C is superior to the filter B in this respect. Similarly, the filter A is better than the filter B with which equilibrium is reached only at a higher concentration $s$. Thus it is clear that even if new particles are being continuously added to the fluid, the shape of the curves illustrated is determinative. By means of the filter according to the invention, curves can be obtained which permit a smaller remainder to be attained in a shorter time than it has been possible with prior filters of this general type.

Good results have been obtained by using in a filter of the construction shown in Fig. 1, a permanent magnet weighing about 300 gms., by making the distance $x$ and $y$ equal to about 1½ mm., and using a field strength of about 2500 g. in the air-gaps 16, between the parts 14 and in the air gaps 20 and 21, each having a length of 1½ mm. About 2,500 gs. of machine oil containing about 6,000 mgs. of iron particles of the order of magnitude of about 1 micron was passed by the air-gaps at a speed of about 25 cm. per sec. and substantially all the iron particles were eliminated from the oil in about 2½ hours without cleaning the filter. In this case no new particles were added to the fluid because the oil was not used for lubricating purposes, but was merely circulated through the filter by a pump.

We wish it to be understood that we do not desire to be limited to the exact details of construction shown and described, for obvious modifications will occur to a person skilled in this art.

What we claim is:

1. A magnetic filter for removing magnetizable particles from a flowing fluid, comprising a housing provided with an inlet opening and an outlet openings, means forming between said openings two passageways each having a long narrow transverse cross-section, said means comprising a plurality of annular members of magnetizable material secured together to form a cylindrical body forming one of said passageways with the housing, said members being spaced apart to form a plurality of annular air gaps which are accessible for the fluid and lie outside said passageways and adjacent thereto, a cylindrical member within said body and forming with the inner surface thereof the second passageway, and means for producing in each of said air gaps a magnetic field which extends throughout the width of said passageways.

2. A magnetic filter for removing magnetizable particles from a flowing fluid, comprising a housing provided with an inlet opening and an outlet opening for the fluid, a plurality of tubular pole pieces arranged in alignment, a support of non-magnetic material secured to said pole pieces and forming therewith a passageway having a long narrow transverse cross-section, said pole pieces being spaced apart to form intermediate air gaps accessible for said fluid but located outside said passageway, a pole plate at each end of the pole piece assembly and provided with apertures to permit passage of the fluid through said passageway, and a permanent magnet for producing in said air gaps a magnetic field extending throughout the width of the passageway.

3. A magnetic filter for removing magnetizable particles from a flowing fluid, comprising a housing provided with a cylindrical cavity and inlet and outlet openings for said fluid, and a cylindrical-shaped magnetic unit removably supported within said cavity, said unit comprising a central supporting member of non-magnetic material, an annular permanent magnet surrounding said member, an annular guiding member of non-magnetic material surrounding said magnet, a plurality of annular pole pieces surrounding said guiding member and spaced apart to form a plurality of annual air gaps, said pole pieces forming with said guiding member and with the inner surface of the housing two annular passageways for the fluid each having a transverse cross-section in the form of an annular narrow slit, a pole plate at each end of the unit and provided with apertures for the passage of the fluid to and from the passageway formed between the pole pieces and guiding member, and means for clamping said magnet, guiding member and pole pieces between said plates including said central support.

4. A magnetic filter for removing magnetizable particles from a fluid, comprising a housing provided with an inlet opening and an outlet opening for the fluid, means forming between said openings two passageways for the fluid each having a long narrow transverse cross-section, said means comprising a hollow body including a plurality of members of magnetizable material whose outer surfaces form one side of one of said passageways, said members being spaced apart to form a plurality of air gaps which extend around the periphery of said passageways, are accessible for the fluid and lie outside the passageways, and a body within the hollow of said body and forming the second passageway with the inner surfaces of said members, and means for producing in said air gaps magnetic fields which extend throughout the width of the passageways.

5. A magnetic filter for removing magnetizable particles from a fluid, comprising a housing provided with an inlet opening and an outlet opening for the fluid, means forming between said openings two passageways for the fluid each having a long narrow transverse cross-section, said means comprising a hollow body including a plurality of members of magnetizable material whose outer surfaces form one side of one of said passageways, a member of non-magnetizable material securing together the magnetizable members in spaced relationship to form a plurality of air gaps which extend around the periphery of said passageways, are accessible to the fluid and lie outside the passageways, and a member within said hollow body and forming the second passageway with the inner surfaces of said magnetizable members, and means for producing in said air gaps magnetic fields which extend throughout the width of the passageways.

6. A magnetic filter for removing magnetizable particles from a flowing fluid, comprising a housing provided with a cylindrical cavity and inlet and outlet openings for said fluid, and a cylindrical-shaped magnetic unit removably supported within said cavity, said unit comprising a permanent magnet member, an annular guiding member of non-magnetic material surrounding said magnet, semi-circular members of magnetizable material positionable in abutting relationship to form a plurality of annular pole pieces surrounding said guiding member, members of non-magnetic material securing together the semi-circular pole pieces in spaced relationship to form a plurality of air gaps, said pole pieces forming with said guiding member and with the inner surface of the housing two annular passageways for the fluid each having a transverse cross-section in the form of an annular narrow slit, a pole plate at each end of the unit and provided with apertures for the passage of the fluid to and from the passageway formed between the pole pieces and the guiding member, and means comprising said pole piece securing members for positioning said pole pieces between said pole plates.

MAURITS KIEK.
JOHAN ANINGA.